(12) United States Patent
Wimmer et al.

(10) Patent No.: US 9,266,531 B2
(45) Date of Patent: Feb. 23, 2016

(54) METHOD AND CONTROL APPARATUS FOR OPERATING A ROAD-BOUND HYBRID VEHICLE

(71) Applicant: Bayerische Motoren Werke Aktiengesellschaft, Munich (DE)

(72) Inventors: Christian Wimmer, Munich (DE); Jan Felten, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/613,908

(22) Filed: Feb. 4, 2015

(65) Prior Publication Data

US 2015/0217759 A1 Aug. 6, 2015

(30) Foreign Application Priority Data

Feb. 5, 2014 (DE) .......................... 10 2014 202 103

(51) Int. Cl.
| | |
|---|---|
| *B60W 20/00* | (2006.01) |
| *B60W 10/06* | (2006.01) |
| *B60W 10/08* | (2006.01) |
| *B60W 30/045* | (2012.01) |
| *B60W 30/18* | (2012.01) |

(52) U.S. Cl.
CPC ............ *B60W 20/108* (2013.01); *B60W 10/06* (2013.01); *B60W 10/08* (2013.01); *B60W 20/106* (2013.01); *B60W 30/045* (2013.01); *B60W 30/18145* (2013.01); *B60W 30/18172* (2013.01); *B60W 2510/20* (2013.01); *B60W 2520/10* (2013.01); *B60W 2520/263* (2013.01); *B60W 2540/18* (2013.01); *B60W 2720/30* (2013.01); *Y10S 903/93* (2013.01)

(58) Field of Classification Search
CPC ... B60W 10/06; B60W 10/08; B60W 20/108; B60W 30/045; B60W 20/106; Y10S 903/93
See application file for complete search history.

(56) References Cited

U.S. PATENT DOCUMENTS

| | | | |
|---|---|---|---|
| 2008/0029320 A1 | 2/2008 | Fleckner et al. | |
| 2011/0017534 A1 | 1/2011 | Kaltenbach et al. | |
| 2013/0035818 A1 | 2/2013 | Meitinger et al. | |
| 2014/0025241 A1* | 1/2014 | Andou .................. | B60K 28/16 701/22 |
| 2014/0343774 A1 | 11/2014 | Wimmer et al. | |
| 2015/0088356 A1 | 3/2015 | Sailer et al. | |

FOREIGN PATENT DOCUMENTS

| | | |
|---|---|---|
| DE | 10 2005 044 828 A1 | 3/2007 |
| DE | 10 2006 034 933 A1 | 1/2008 |
| DE | 10 2008 035 451 A1 | 3/2009 |
| DE | 10 2010 014 971 A1 | 10/2011 |
| DE | 10 2012 211 920 A1 | 1/2014 |
| DE | 10 2013 208 965 A1 | 11/2014 |
| DE | 10 2013 219 085 A1 | 3/2015 |
| WO | WO 2009/021913 A2 | 2/2009 |

OTHER PUBLICATIONS

German Search Report dated Apr. 17, 2014 with partial English-language translation (Thirteen (13) pages).

* cited by examiner

*Primary Examiner* — Mary Cheung
*Assistant Examiner* — Yuen Wong
(74) *Attorney, Agent, or Firm* — Crowell & Moring LLP

(57) ABSTRACT

A control apparatus and method for operating a road-bound hybrid vehicle are provided. The vehicles includes a control apparatus for controlling the drive torque of a first drive unit which is associated with a first axle and of the drive torque of a second drive unit which is associated with a second axle. One drive unit has at least one electric motor and the other drive unit has at least one internal combustion engine, wherein a load point increase, by which an energy store for operating the electric motor is charged, is limited by the internal combustion engine and the control unit. The limiting is performed by: in a first step, determining a maximum permissible upper limit for the load increase torque under optimum traction conditions depending on the steering angle and on the vehicle speed. In a second step, performing, as required, a torque-reducing adaptation of the previously determined upper limit to match traction-impairing environmental influences which may be present.

5 Claims, 2 Drawing Sheets

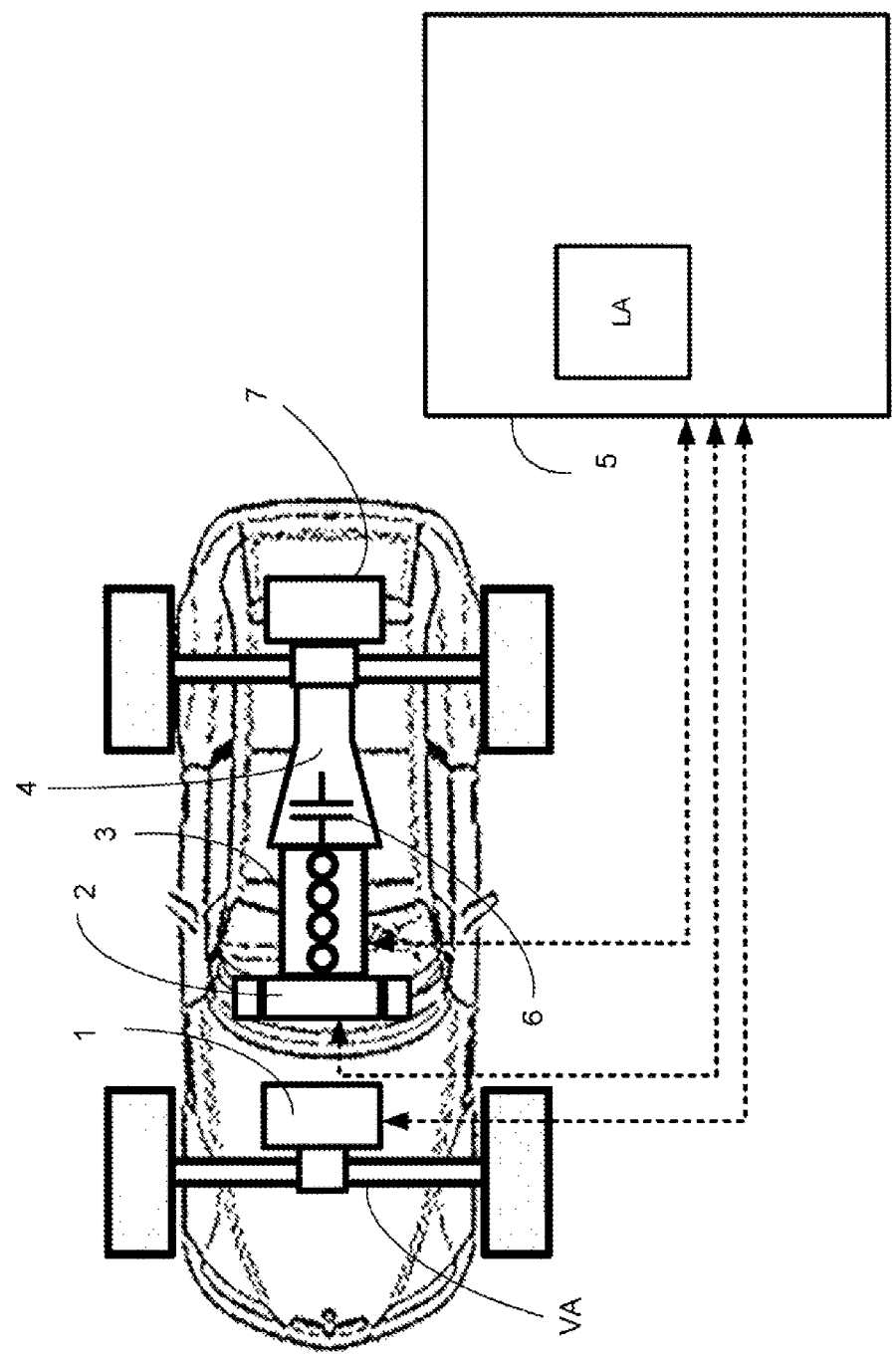

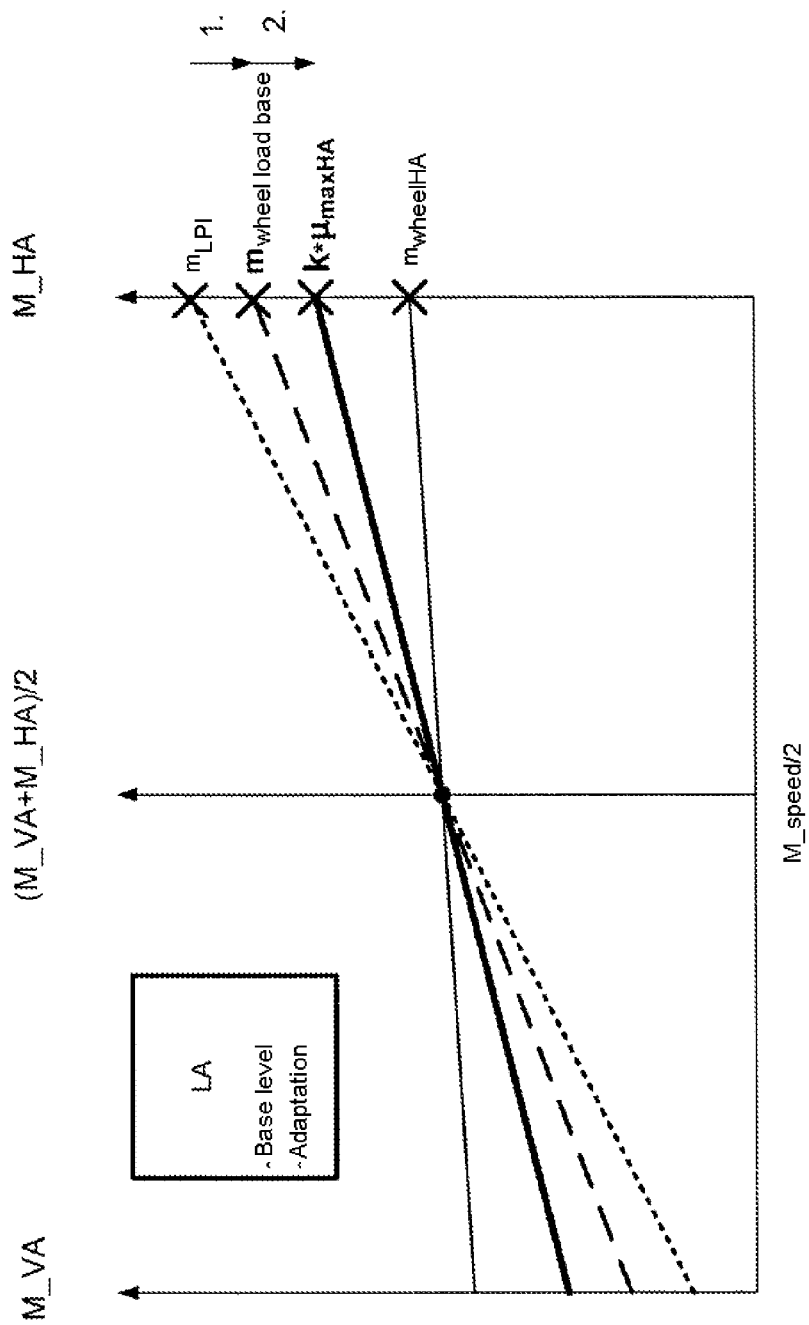

METHOD AND CONTROL APPARATUS FOR OPERATING A ROAD-BOUND HYBRID VEHICLE

CROSS REFERENCE TO RELATED APPLICATION

This application claims priority under 35 U.S.C. §119 from German Patent Application No. 10 2014 202 103.0, filed Feb. 5, 2014, the entire disclosure of which is herein expressly incorporated by reference.

BACKGROUND AND SUMMARY OF THE INVENTION

The invention relates to a method and to a control apparatus for operating a road-bound hybrid vehicle having an electronic control unit, having a first drive unit (for example, an electric motor) which is associated with a first axle (for example, the front axle) and having a second drive unit (for example, an internal combustion engine or internal combustion engine and electric motor) which is associated with a second axle (for example, the rear axle).

Different methods for operating a road-bound hybrid vehicle are described, for example, in German patent applications DE 10 2012 211 920, DE 10 2013 208 965 and DE 10 2013 219 085.

German patent application DE 10 2012 211 920 discloses a so-called road-bound hybrid vehicle having at least one primary motor (for example, an electric motor) which acts as a drive motor on a first axle of the hybrid vehicle, and having a secondary motor (for example, an internal combustion engine) which acts as a drive motor on a second axle of the hybrid vehicle. In this case, the primary motor and the secondary motor are not drive-coupled by means of a clutch, but rather merely by the road by way of the wheels. Road-bound hybrid vehicles of this kind are also known as "split-axle" hybrid vehicles. In this case, an electric motor is preferably used as the primary motor and an internal combustion engine is preferably used as the secondary motor.

German patent applications DE 10 2012 211 920 and DE 10 2013 208 965 are concerned with methods for connecting the secondary motor.

DE 10 2005 044 828 A1 describes a method for ascertaining the optimum operating point for hybrid vehicles. In this case, in addition to dynamic effects, driving stability and transmission interventions of the vehicle, in particular, are also taken into account. The optimum operating point is ascertained as follows: in a first step, first coordinates are ascertained with the aid of a stored characteristic map, and in a subsequent second step, these coordinates are optimized taking into account the dynamic behavior.

DE 10 2008 035 451 A1 describes a method for optimizing a hybrid vehicle by way of controlling the power output of the electric motor in such a way that a power output of the internal combustion engine is adjusted to a load point which is optimum for its operating state. In this case, the total power of the hybrid vehicle remains constant. The total power of the vehicle can be increased by using the electric motor as a generator for charging electrical storage devices of the hybrid vehicle. In this case, the load point of the internal combustion engine is regulated such that the internal combustion engine can be operated with as low a level of consumption as possible.

DE 10 2006 034 933 A1 describes a method for controlling and monitoring a hybrid vehicle in an optimized manner, wherein the objectives may be both an increase in driving convenience and also advantages in respect of consumption. The load point increase is monitored and controlled in a flexible manner depending on the operating mode which is detected by specific sensors (for example, type of road, traffic situation, type of terrain, vehicle speed, road gradient, state of charge).

WO 09021913 A2 describes a method for shifting the load point during hybrid operation in the case of a parallel hybrid vehicle, it being possible to set an operating point of the internal combustion engine which is advantageous in respect of consumption and an optimum state of charge of the energy storage devices by carrying out the method for shifting the load point.

The object of the invention is to improve a hybrid vehicle of the above mentioned type both in respect of reproducible steering-related accuracy and also in respect of the driving stability when traveling around a bend.

This and other objects are achieved according to the invention.

The invention relates to a control apparatus, as well as to a method for operating a road-bound hybrid vehicle having the control apparatus, for controlling the drive torque of a first drive unit which is associated with a first axle (for example, the front axle) and of the drive torque of a second drive unit which is associated with a second axle (for example, the rear axle). In this case, one drive unit has at least one electric motor and the other drive unit has at least one internal combustion engine. According to the invention, a load point increase, by which an energy storage device for operating the electric motor is intended to be charged on the basis of a hybrid operating strategy, is limited by the internal combustion engine and the control unit using the following two steps:

(a) in a first step, a maximum permissible upper limit (base level) for the load increase torque under optimum traction conditions (high friction value) is ascertained depending on the steering angle and on the vehicle speed; and (b) in a second step, a torque-reducing adaptation of the previously determined upper limit to match traction-impairing environmental influences (low friction value; ice, snow, rain, grit etc.) which may be present is performed as required.

The first limiting to the base level serves, in particular, for accuracy and ability to replicate traveling around a bend with the same steering angle and the same vehicle speed in each case. The second further limiting, which may be performed as desired, serves to improve the traction, the lateral guidance and the self-steering behavior when traveling around a bend in driving-dynamics limit regions.

The invention is based on the following considerations: in the case of hybrid vehicles, the so-called method of "load point increase" is often utilized in order to charge the energy store during driving. The electrical machine (electric motor) is operated as a generator with the principle of the load point increase. An additional torque is applied to the crankshaft in addition to the torque which is required by the internal combustion engine to drive the vehicle. In this case, the operating point of the internal combustion engine can be shifted into regions of better specific consumption. In contrast to a conventional drive train which is driven purely by internal combustion engine, the internal combustion engine, under increased load, generates more power than necessary for driving the vehicle in this case. This additional power is converted into electrical power by the generator and supplied to an electrical energy store. This additional power is therefore available for driving using the electrical machine at a later point-in-time.

The drive concept according to the invention is a road-bound parallel drive ("split-axle"). A characteristic feature of said drive is coupling between an electrical machine on a first axle and an internal combustion engine on another axle solely by way of the road (no mechanical or electrical coupling). By way of example, an embodiment in which the internal combustion engine is located on the rear axle (HA) and the electrical machine is located on the front axle (VA) is considered in this invention. In contrast to the identified prior art, the invention presented here relates solely to monitoring and taking into account the driving-dynamics relationships during the load point increase. This is superimposed on the efficiency-oriented actuation according to the prior art and provides an upper limit for this actuation.

In the case of conventional, branched-power hybrid vehicles which are coupled to one another both mechanically and electrically, the shifted torque between the electrical machine and the internal combustion engine does not act on the wheels (i.e., it is neutral in respect of wheel torque) since said torque is already compensated for on the shaft between the two drives. In the case of a road-bound load point increase however, as is produced in the case of an "split-axle" concept, each torque, which is generated by means of the load point increase, acts on the wheel torque; that is to say it is transmitted across the contact area tires-roadway and, respectively, roadway-tires. Influencing of the wheel torques by the load point increase in this way has negative effects on the driving dynamics. The axles distort. The higher the torque of the load point increase, the poorer the vehicle guidance properties, for example the accuracy when traveling around a bend or the cornering precision. The steering forces are increased, and in addition the steering angle requirement increases. The traction and stability fall to a significant extent, in particular to a low friction value.

In order to solve the above-mentioned problems of the load point increase, the objective of the invention is to provide a driving-dynamics monitoring mechanism which limits the load point increase to an acceptable level. Negative influencing of the stability or dynamics is restricted or even disabled.

The process according to the invention of limiting the load point increase is made up of two components. The first component provides the so-called "base level". A maximum permissible upper limit is ascertained under optimum traction conditions (high friction value) depending on steering angle and speed.

The second component constitutes adaptation (to lower values) of the previously determined base level to match environmental influences. In this case, the base level ($1^{st}$ component) can only be further reduced to the value zero at the minimum. The maximum load point increase by means of the adaptive limiting is formed by a minimum selection from a friction value model (environmental influences, component 2), and the base level (component 1). This can preferably be described by the following function:

$$\text{MIN}(m_{wheel\ load\ base}, k^*_{\mu\ max\ HA} - m_{wheelHA}).$$

In this case, the value $m_{wheel\ load\ base}$ represents the base level (component 1). The value $k^*_{\mu\ max\ HA}$ represents, for adaptation, a scaled potential variable depending on the vehicle environment information (for example, the gradient, friction value (wet, slippery or snow-covered roadway), other driving resistances). The value $m_{wheelHA}$ describes the wheel torque on the rear axle free of an additional load point increase function.

The respective values of this function are further explained and graphically illustrated in the exemplary embodiment.

Therefore, depending on a determined driving situation, a maximum permissible load point increase torque from a driving-dynamics point of view can be predefined by superimposition or minimum selection of the two components.

Additional information can also be inserted into the scaled information (for example, Car2Car communication, navigation information, prediction information, environment sensors, etc.) for determining the $2^{nd}$ component.

Owing to a simple application of a driving-dynamics monitoring system, the load point increase can be limited to a driving-dynamics-compatible torque in critical situations. As a result, the driving stability can be ensured and/or improved particularly in situations of this kind (for example, a low friction value and/or the traveling around a bend). In addition, the driving convenience can be improved by steering properties remaining the same.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic illustration of a road-bound hybrid vehicle having components for practicing the method according to an embodiment of the invention; and FIG. 2 is a graphical illustration of the method steps according to an embodiment of the invention.

DETAILED DESCRIPTION OF THE DRAWINGS

FIG. 1 shows a so-called road-bound hybrid vehicle having a first electric motor 1 as the primary motor which acts as a drive motor, for example, on the front axle VA, and having an internal combustion engine 3 as the secondary motor which acts as a drive motor on the rear axle. A second electric motor 2 can be provided in addition to the internal combustion engine 3. Furthermore, an automatic transmission 4 can be connected to the internal combustion engine 3 at the input end. Similarly, the invention can also be used when the components 2, 3 and 4 are arranged in a different order; for example also for an arrangement in which the electric motor 2 is arranged between the internal combustion engine 3 and the automatic transmission 4. In the case of another road-bound hybrid vehicle according to the invention, the front axle VA could also be driven by an internal combustion engine and the rear axle by an electric motor. Finally, the hybrid vehicle has an electrical energy store 7 for driving the electric motors 1 and 2, it being possible for said electrical energy store to be charged, in particular, by an excess torque (load point increase) of the internal combustion engine 3 with the electric motor 2 being operated as a generator.

The method for controlling the operation of the hybrid vehicle is carried out by an electronic controller 5 which has corresponding programmable functional modules and also connections to the necessary sensors and actuators. According to the invention, a functional module LA ("load point increase") is contained, for example, in the form of a software program portion, the design and manner of operation of said software program portion being discussed in greater detail with reference to FIG. 2:

FIG. 2 shows, by way of the line comprising short dashes, the axle torque distribution with an unlimited load point increase according to the prior art with a torque $m_{LPI}$ in this case on the rear axle, wherein M_VA represents the drive torque on the front axle and M_HA represents the drive torque on the rear axle. With the first functional component of the functional module LA, the unlimited load point increase $m_{LPI}$ which is ascertained from the operating strategy is limited in a 1st signal path to the base level $M_{wheel\ load\ base}$ (line comprising long dashes) as a function of the vehicle speed and the steering angle. A model-assisted adaptive component $k*\mu_{max}$ HA is superimposed (in this case in a further limiting manner) on this base level $m_{wheel\ load\ base}$ in a $2^{nd}$ signal path with the second functional component of the functional module LA. In this case, a friction value level on the two axles is calculated depending on the environmental influences and scaled down by a factor (in this case: k) above this level, the intention being for the final maximum load point increase (thick solid line) to take place at said level. The total torque comprising the regular propulsion and the load point increase on the rear axle HA is therefore always below the previously defined scaled limit region. For comparison, drive control without a load point increase is illustrated by a torque $m_{wheelHA}$ by way of the thin solid line.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control apparatus for operating a road-bound split-axle hybrid vehicle having a first drive unit associated with a first axle and a second drive unit associated with a second axle, wherein one drive unit has at least one electric motor and the other drive unit has at least one internal combustion engine, and further wherein a load point increase ($m_{LPI}$) is performed by the at least one internal combustion engine, an energy store for operating the at least one electric motor being chargeable by said load point increase, the control apparatus comprising:
   an electronic control unit, wherein the electronic control unit is configured to limit said load point increase ($m_{LPI}$) by the at least one internal combustion engine by:
      determining a maximum permissible upper limit ($m_{wheel\ load\ base}$) for load increase torque under optimum traction conditions depending on a steering angle and on a vehicle speed of the road-bound split-axle hybrid vehicle;
      performing a torque-reducing adaptation ($k*\mu_{max\ HA}$) of the previously determined maximum permissible upper limit ($m_{wheel\ load\ base}$) to match traction-impaired environmental influences; and
      controlling said load point increase to a driving-dynamics-compatible torque on the traction impaired environmental influences.

2. The control apparatus as claimed in claim 1, wherein a base level ($m_{wheel\ load\ base}$) of the electronic control unit is reduceable to a value zero at a minimum.

3. The control apparatus as claim 2, wherein adaptive limiting for ascertaining a final maximum load point increase is realized by a minimum selection (MIN) from the base level ($m_{wheel\ load\ base}$) determined in the electronic control unit and from a friction value model result ($k*\mu_{max\ HA}$-$m_{wheelHA}$) determined in the electronic control unit in respect of traction-determining environmental influences.

4. The control apparatus as claim 1, wherein adaptive limiting for ascertaining a final maximum load point increase is realized by a minimum selection (MIN) from the base level ($m_{wheel\ load\ base}$) determined in the electronic control unit and from a friction value model result ($k*\mu_{max\ HA}$-$m_{wheelHA}$) determined in the electronic control unit in respect of traction-determining environmental influences.

5. A method for operating a road-bound split-axle hybrid vehicle having an electronic control unit for controlling drive torque (M_VA) of a first drive unit associated with a first axle and drive torque (M_HA) of a second drive unit which associated with a second axle, wherein one drive unit has at least one electric motor and the other drive unit has at least one internal combustion engine, the method comprising the acts of:
   limiting a load point increase, by which an energy store for operating the at least one electric motor is charged, by the at least one internal combustion engine and the electronic control unit, wherein
      in a first step, determining, by the electronic control unit, a maximum permissible upper limit ($m_{wheel\ load\ base}$) for a load increase torque under optimum traction conditions depending on a steering angle and on a vehicle speed of the road-bound split-axle hybrid vehicle; and
      in a second step, performing, by the electronic control unit, a torque-reducing adaptation ($k*\mu_{max\ HA}$) of a previously determined maximum permissible upper limit ($m_{wheel\ load\ base}$) to match traction-impaired environmental influences; and
   controlling said load point increase to a driving dynamics compatible torque on the traction impaired environmental influences.

* * * * *